(12) United States Patent
Hoda et al.

(10) Patent No.: US 8,477,231 B2
(45) Date of Patent: Jul. 2, 2013

(54) IMAGE SENSING APPARATUS

(75) Inventors: Saori Hoda, Kawasaki (JP); Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 12/921,190

(22) PCT Filed: Apr. 27, 2009

(86) PCT No.: PCT/JP2009/058655
§ 371 (c)(1),
(2), (4) Date: Sep. 7, 2010

(87) PCT Pub. No.: WO2009/133960
PCT Pub. Date: Nov. 5, 2009

(65) Prior Publication Data
US 2011/0013061 A1    Jan. 20, 2011

(30) Foreign Application Priority Data
Apr. 30, 2008   (JP) ................................ 2008-119057

(51) Int. Cl.
*H04N 5/232* (2006.01)

(52) U.S. Cl.
USPC ........................................................ 348/345

(58) Field of Classification Search
USPC ....................................................... 348/345
See application file for complete search history.

(56) References Cited

U.S. PATENT DOCUMENTS

| | | | |
|---|---|---|---|
| 5,754,226 A | 5/1998 | Yamada et al. | |
| 5,969,757 A | 10/1999 | Okada et al. | |
| 6,829,008 B1 * | 12/2004 | Kondo et al. | 348/302 |
| 7,873,267 B2 * | 1/2011 | Kusaka | 396/104 |
| 7,978,255 B2 * | 7/2011 | Suzuki | 348/350 |
| 2002/0097324 A1 | 7/2002 | Onuki | |

FOREIGN PATENT DOCUMENTS

| | | |
|---|---|---|
| JP | 01-138402 A | 5/1989 |
| JP | 08-172568 A | 7/1996 |
| JP | 09-065219 A | 3/1997 |
| JP | 09-074524 A | 3/1997 |
| JP | 10-191135 A | 7/1998 |
| JP | 2003-023567 A | 1/2003 |
| JP | 2003-250080 A | 9/2003 |

(Continued)

OTHER PUBLICATIONS

Jun. 9, 2009 International Search Report and Written Opinion in PCT/JP2009/058655.
European Search Report, dated Jul. 29, 2011, in European Patent Application No. 09738897.9.
Office Action dated Apr. 26, 2013, in Japanese Patent Application No. 2009-108464.

*Primary Examiner* — James Hannett
(74) *Attorney, Agent, or Firm* — Fitzpatrick, Cella, Harper & Scinto

(57) ABSTRACT

An image sensing apparatus comprises an image sensing unit including an image sensor having a plurality of image sensing pixels and a plurality of focus detection pixels discretely arranged between the plurality of image sensing pixels, a shift detection unit that detects a shift amount between images obtained by a plurality of image sensing operations, a combining unit that combines signals of the focus detection pixels contained in the images obtained by the plurality of image sensing operations on the basis of the shift amount detected by the shift detection unit, and a focus adjustment unit that adjusts a focus of the imaging lens by using signals of the focus detection pixels before combined by the combining unit, and signals of the focus detection pixels that are combined by the combining unit.

4 Claims, 6 Drawing Sheets

FOREIGN PATENT DOCUMENTS

| | | | |
|---|---|---|---|
| JP | 2004-117712 A | 4/2004 |
| JP | 2005-303409 A | 10/2005 |
| JP | 2007-310043 A | 11/2007 |
| JP | 2008-083456 A | 4/2008 |
| WO | 2008-032820 A1 | 3/2008 |

\* cited by examiner

IMAGE SENSING APPARATUS

TECHNICAL FIELD

The present invention relates to an automatic focus adjustment technique in an image sensing apparatus such as a digital camera.

BACKGROUND ART

These days, image sensors in solid-state image sensing apparatuses such as a digital still camera have abruptly increased the number of pixels, and need to perform high-precision image processing at high speeds.

To achieve high-precision automatic focus adjustment (to be referred to as AF hereinafter) at high speeds, there has conventionally been proposed a technique of arranging AF pixels (to be referred to as focus detection pixels hereinafter) as some pixels of an image sensor 601, as shown in FIGS. 7 and 8. As shown in FIG. 7, the light receiving portion is divided to make pupil positions symmetrical to each other. One light receiving portion is defined as a focus detection pixel (A image) 501, and the other is defined as a focus detection pixel (B image) 502.

As shown in FIG. 8, the focus detection pixels (A images) 501 and focus detection pixels (B images) 502 are scattered at a certain ratio to all the pixels of the image sensor. Focus detection is done by comparing the phase differences between focus detection pixels (A images) 604 and focus detection pixels (B images) 605 at the same horizontal position.

In the conventional arrangement, focus detection pixels are arranged discretely, so an alias (aliasing) readily occurs and greatly degrades the AF performance.

As a conventional technique for reducing aliases contained in pixel information, the following proposals have been made.

Japanese Patent Laid-Open No. 9-65219 proposes a technique of repeating the displacement of an image sensor by a shift means to form an equivalently optical low-pass filter, thereby effectively avoiding generation of aliasing of a video signal.

Japanese Patent Laid-Open No. 9-74524 proposes the following technique. When moire is detected upon receiving an image of the first resolution, an image of the second resolution increased by an image shift means is generated. If no moire is detected, no moire removal circuit operates, suppressing power consumption.

However, the proposals by Japanese Patent Laid-Open Nos. 9-65219 and 9-74524 are not aimed at reducing aliases of focus detection pixels scattering in an image sensor. These references do not mention a measure against camera shake. In general, detection of a positional shift amount by matching calculation using an alias-containing image tends to fail. Thus, conventional techniques hardly reduce aliases of focus detection pixels.

DISCLOSURE OF INVENTION

The present invention has been made to overcome the conventional drawbacks, and reduces aliases contained in focus detection pixels and improve the AF performance.

According to the first aspect of the present invention, there is provided an image sensing apparatus comprising image sensing means including an image sensor having a plurality of image sensing pixels for photoelectrically converting an object image formed via an imaging lens to generate an image signal, and a plurality of focus detection pixels discretely arranged between the plurality of image sensing pixels, shift detection means for detecting a shift amount between images obtained by a plurality of image sensing operations using signals of the image sensing pixels contained in image signals obtained by the plurality of image sensing operations that are continuously obtained by the image sensing means and shifted in position from each other, combining means for combining signals of the focus detection pixels contained in the images obtained by the plurality of image sensing operations on the basis of the shift amount detected by the shift detection means, and focus adjustment means for adjusting a focus of the imaging lens by using signals of the focus detection pixels before being combined by the combining means, and signals of the focus detection pixels that are combined by the combining means.

According to the second aspect of the present invention, there is provided a method of controlling an image sensing apparatus having an image sensing means including an image sensor having a plurality of image sensing pixels for photoelectrically converting an object image formed via an imaging lens to generate an image signal, and a plurality of focus detection pixels discretely arranged between the plurality of image sensing pixels, the method comprising a shift detection step of detecting a shift amount between images obtained by a plurality of image sensing operations using signals of the image sensing pixels contained in image signals obtained by the plurality of image sensing operations that are continuously obtained by the image sensing means and shifted in position from each other, a combining step of combining signals of the focus detection pixels contained in the images obtained by the plurality of image sensing operations on the basis of the shift amount detected in the shift detection step, and a focus adjustment step of adjusting a focus of the imaging lens by using signals of the focus detection pixels before being combined in the combining step, and signals of the focus detection pixels that are combined in the combining step.

Further features of the present invention will become apparent from the following description of exemplary embodiments with reference to the attached drawings.

BEST MODE FOR CARRYING OUT THE INVENTION

Embodiments of the present invention will be described in detail below with reference to the accompanying drawings.

First Embodiment

Figure 1:
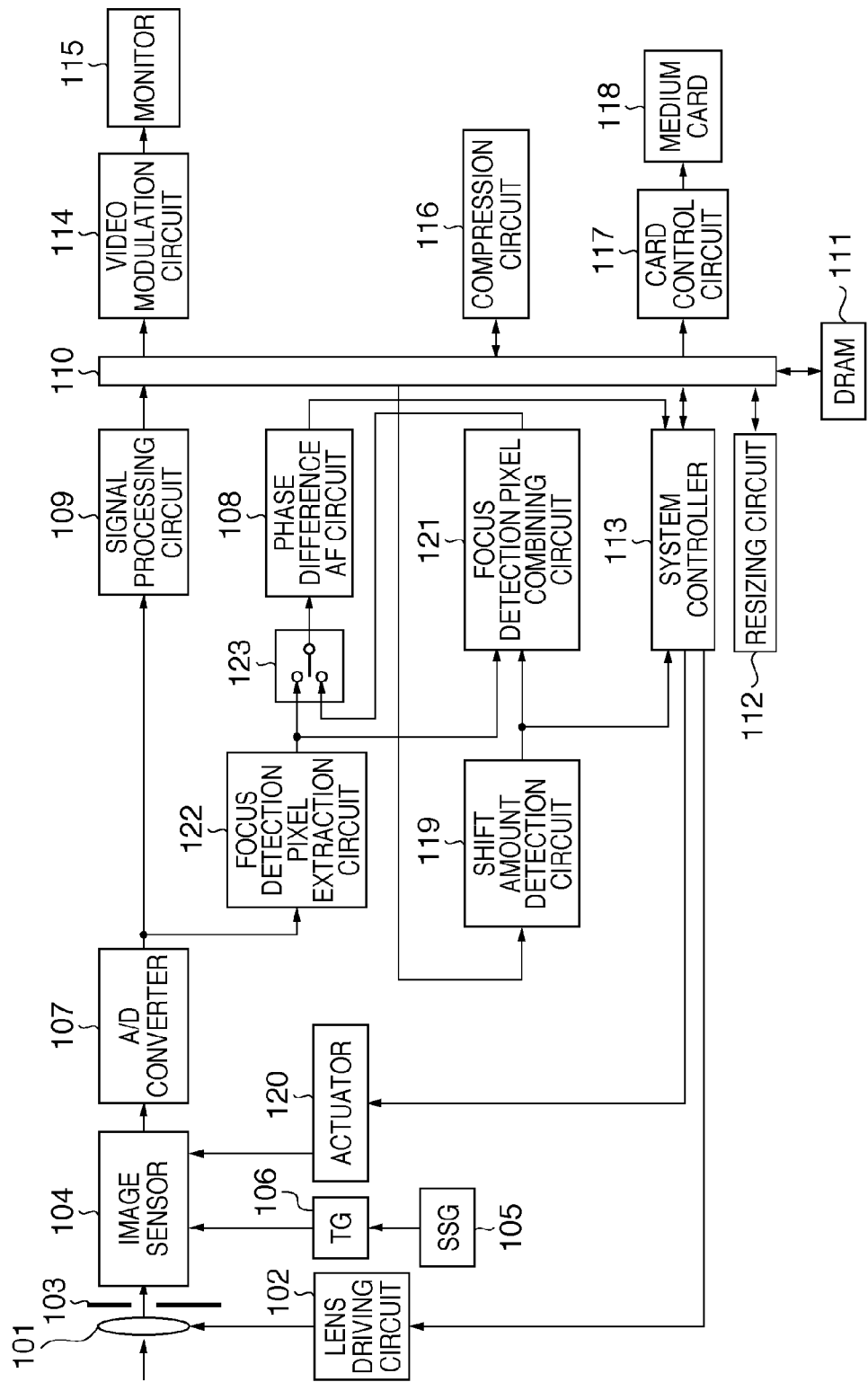
FIG. 1 is a block diagram showing the circuit arrangement of an image sensing apparatus according to the first embodiment of the present invention.

FIG. 1 is a block diagram showing the circuit arrangement of an image sensing apparatus according to the first embodiment of the present invention.

Figure 7:
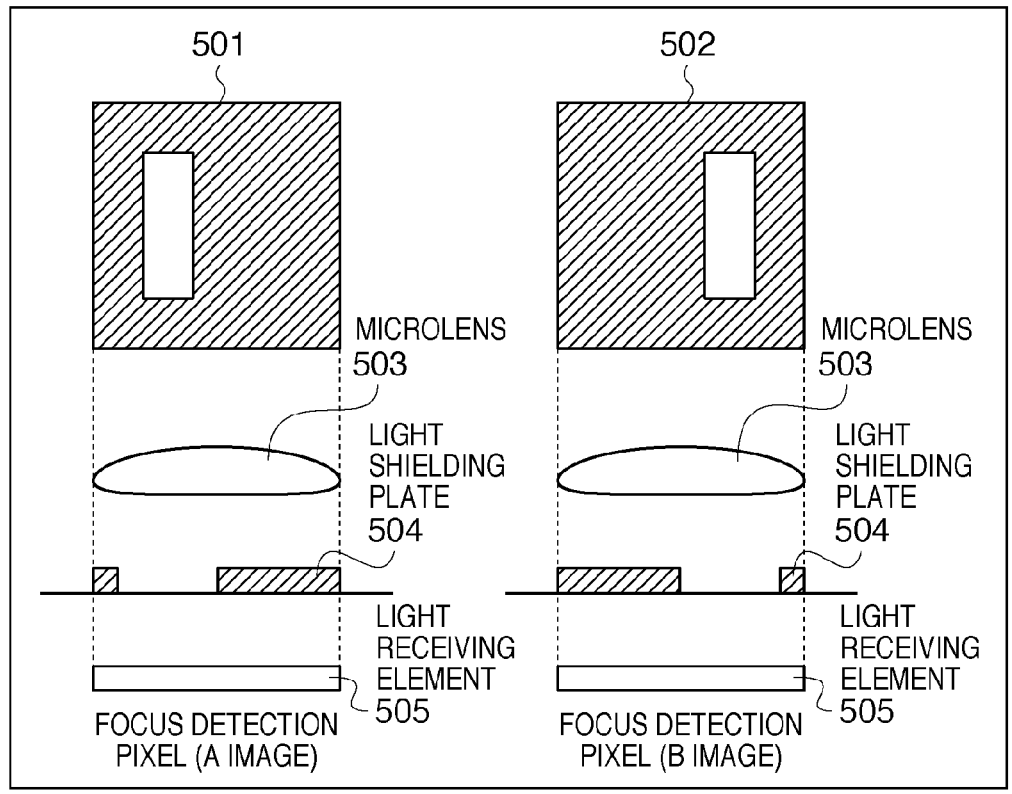
FIG. 7 is a view showing focus detection pixels whose pupil positions are divided symmetrically.
Figure 8:
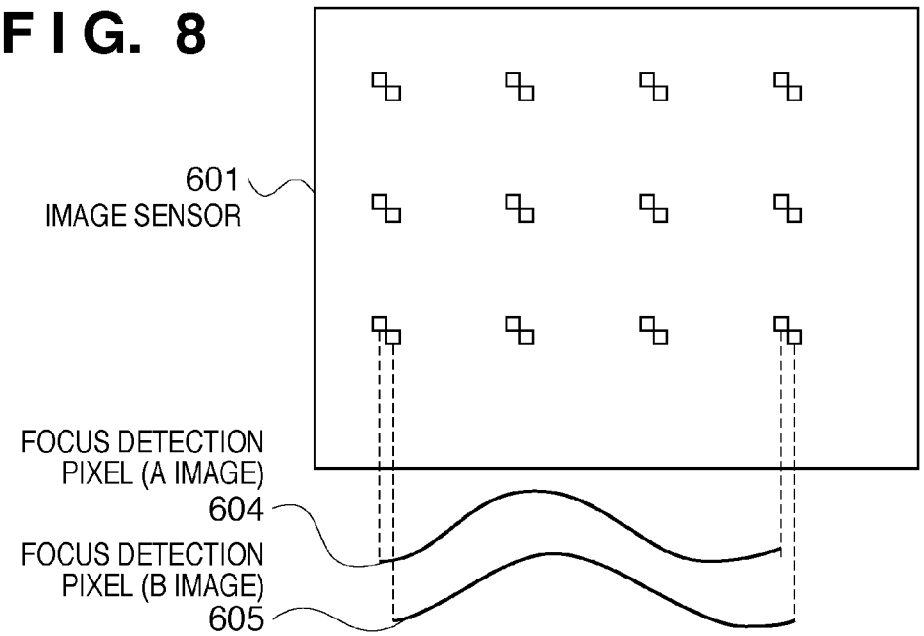
FIG. 8 is a view showing a state in which focus detection pixels exist discretely on an image sensor.

In FIG. 1, a lens driving circuit 102 drives an imaging lens 101. A stop 103 adjusts the exposure. An image sensor 104 photoelectrically converts an optical signal. In the image sensor 104, some photoelectric conversion cells (image sensing pixels) are replaced with focus detection pixels. The imaging lens 101 is illustrated as one lens, but is generally formed from a plurality of lenses or lens units. An actuator 120 shifts the position of the image sensor 104. A sync signal generator (to be referred to as an SSG hereinafter) 105 generates a horizontal sync signal HD and vertical sync signal VD of fixed cycles. A timing generator (to be referred to as a TG hereinafter) 106 generates a control signal synchronized with HD and VD to drive the image sensor 104. An A/D converter 107 converts an analog image signal output from the image sensor 104 into a digital image signal. A signal processing circuit 109 performs color conversion processing and the like. A focus detection pixel extraction circuit 122 extracts only data of focus detection pixels from image data. A phase difference AF circuit 108 detects the phase difference between a focus detection pixel (A image) and a focus detection pixel (B image) as shown in FIG. 7. A shift amount detection circuit 119 detects the shift amount of an image continuously captured (continuously obtained) by the second image sensing operation from image sensing pixels other than focus detection pixels. A focus detection pixel combining circuit 121 combines AF extracted pixels in a plurality of image sensing operations to generate an AF extracted pixel in one image sensing operation. A switching circuit 123 selects an output from the focus detection pixel extraction circuit 122 or focus detection pixel combining circuit 121, and outputs the selected output to the phase difference AF circuit 108. A memory control circuit 110 interfaces a DRAM 111. A resizing circuit 112 enlarges/reduces image data. A system controller 113 determines the mode and parameter of each circuit and controls the overall image sensing apparatus. A monitor 115 displays image data. A video modulation circuit 114 modulates image data in order to display it on the monitor 115. A compression circuit 116 compresses image data according to the JPEG compression scheme or the like. A detachable medium card 118 records compressed image data. A card control circuit 117 interfaces the medium card 118.

The operation of the image sensing apparatus having the arrangement as shown in FIG. 1 will be explained.

The stop 103 adjusts the quantity of light having passed through the imaging lens 101 from an object to an appropriate one.

The TG 106 generates a timing signal and drives the image sensor 104 so as to operate the image sensor 104 in synchronism with HD and VD generated by the SSG 105. The image sensor 104 photoelectrically converts an object image formed via the imaging lens 101 into an analog image signal. The A/D converter 107 converts the analog image signal into digital image data.

The focus detection pixel extraction circuit 122 extracts only focus detection pixel data from image data, and outputs the extracted data to the phase difference AF circuit 108 via the focus detection pixel combining circuit 121 and switching circuit 123.

The phase difference AF circuit 108 compares the phase differences between the A and B images of the focus detection pixel data, and outputs phase difference information to the system controller 113. In accordance with the phase difference information, the system controller 113 notifies the lens driving circuit 102 of the driving amount of a focus adjustment lens in the imaging lens 101, thereby adjusting the focus.

The signal processing circuit 109 performs signal processing such as color conversion for image data obtained from image sensing pixels. The image data is temporarily written in the DRAM 111 via the memory control circuit 110, and read out again to the shift amount detection circuit 119.

Shift amount detection executed in the shift amount detection circuit 119 will be explained.

Figure 2:
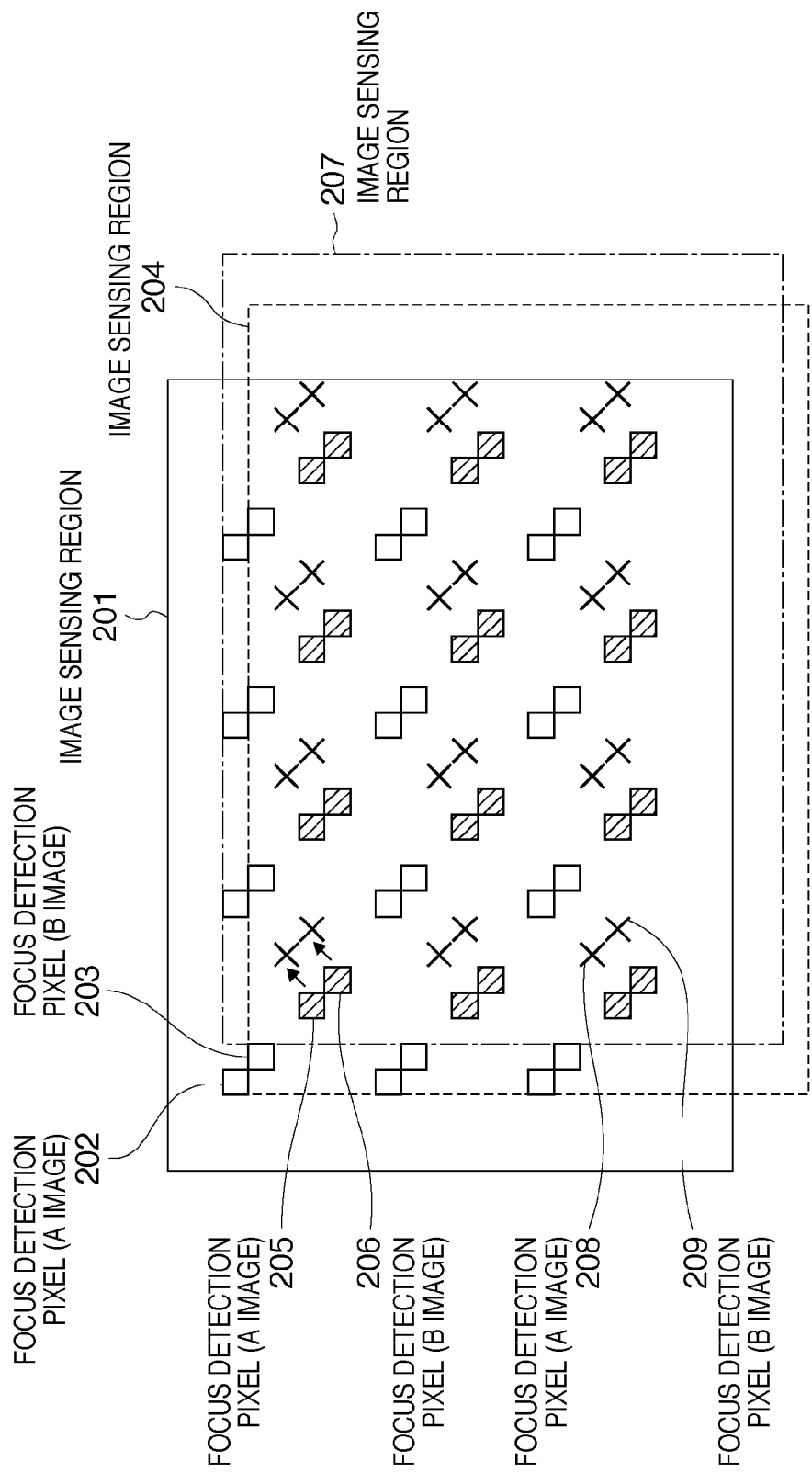
FIG. 2 is a view for explaining a state in which an image sensed by the second image sensing operation shifts from an image (reference image) sensed by the first image sensing operation.

As shown in FIG. 2, focus detection pixels (A images) 202 and focus detection pixels (B images) 203 are scattered in an image sensing region 201 of the image sensor 104.

Assume that information on the positions of the focus detection pixels (A images) 202 and focus detection pixels (B images) 203 is obtained in the first image sensing operation.

Before executing the second image sensing operation, the actuator 120 shifts the position of the image sensor 104 from the position of the image sensing region 201 to that of an image sensing region 204. Then, the positions of the focus detection pixels also shift to positions represented by focus detection pixels (A images) 205 and focus detection pixels (B images) 206. Note that the image sensor is moved in the embodiment, but the lens may also be moved.

If camera shake occurs in an image sensing operation, the position of the image sensing region 204 moved by the actuator 120 shifts to that of an image sensing region 207. The positions of the focus detection pixels also shift to positions represented by focus detection pixels (A images) 208 and focus detection pixels (B images) 209. In this state, the second image sensing operation is done.

As a method of obtaining the shift amount between images obtained by the first and second image sensing operations, the image sensed by the first image sensing operation, and the image sensed by the second image sensing operation that contains a shift generated by camera shake undergo matching calculation using image sensing pixels other than focus detection pixels. The matching calculation employs the following known method. More specifically, image data in the first and second image sensing operations which have undergone signal processing by the signal processing circuit 109 and are written in the DRAM 111 are read out again from the DRAM 111. Then, a position where the differences between image sensing pixels in the first and second image sensing operations minimize as a whole is detected.

Shift-amount-corrected image data of two image sensing operations that are obtained by matching calculation in the shift amount detection circuit 119 are output to the focus detection pixel combining circuit 121.

The focus detection pixel combining circuit 121 executes combining processing by either of the following two methods.

<First Focus Detection Pixel Combining Method>

Figure 3:
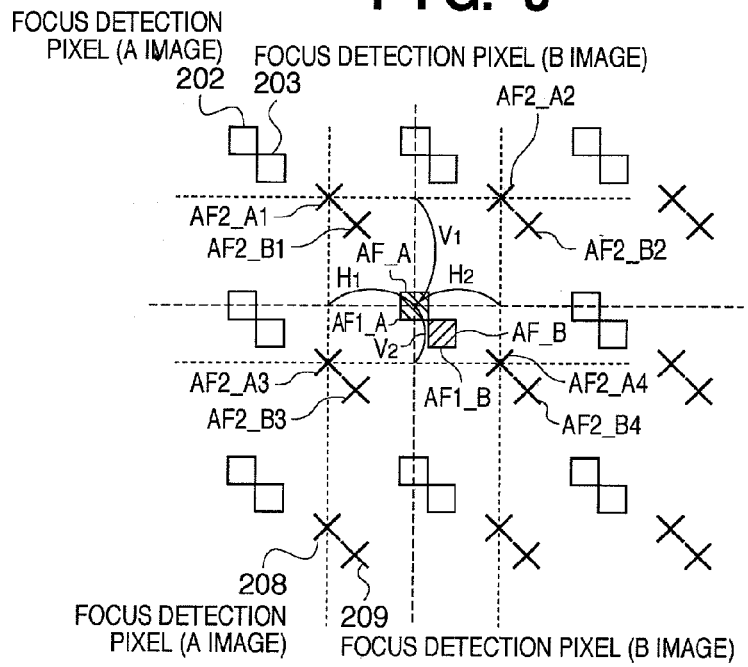
FIG. 3 is a view showing a state in which shifted focus detection pixels in the second image sensing operation are averaged and added to the positions of focus detection pixels in the first image sensing operation.

FIG. 3 shows the first focus detection pixel combining method.

Four pairs of focus detection pixels (A images) 208 and focus detection pixels (B images) 209 positioned around a given focus detection pixel (A image) 202 and focus detection pixel (B image) 203 undergo weighting calculation to superpose them on the positions of the focus detection pixel (A image) 202 and focus detection pixel (B image) 203. Then, averaging is executed. The weighing coefficient is calculated from a shift amount obtained by matching calculation in the shift amount detection circuit 119.

As shown in FIG. 3, AF2_A1, AF2_A2, AF2_A3, and AF2_A4 represent the values of four focus detection pixels (A images) 208 which are obtained by the second image sensing operation and are positioned near focus detection pixels in the first image sensing operation in which the value of the focus detection pixel (A image) 202 is AF1_A and that of the focus detection pixel (B image) 203 is AF1_B. Also, AF2_B1, AF2_B2, AF2_B3, and AF2_B4 represent the values of four focus detection pixels (B images) 209.

As shown in FIG. 3, H1 and H2 represent horizontal distance ratios from AF1_A and AF1_B to four pairs of surrounding focus detection pixels. Similarly, V1 and V2 represent vertical distance ratios.

H1, H2, V1, and V2 satisfy H1+H2=1 and V1+V2=1, respectively.

The values AF2_A and AF2_B from the four pairs of neighboring focus detection pixels to the positions AF1_A and AF1_B are calculated by $$AF2\_A=(AF2\_A1*V2+AF2\_A3*V1)*H2+(AF2\_A2*V2+AF2\_A4*V1)*H1 \quad (1)$$

$$AF2\_B=(AF2\_B1*V2+AF2\_B3*V1)*H2+(AF2\_B2*V2+AF2\_B4*V1)*H1 \quad (2)$$

AF1_A and AF1_B, and AF2_A and AF2_B are averaged, respectively. Pieces of focus detection pixel information AF_A and focus detection pixel information AF_B at the obtained positions are calculated:

$$AF\_A=(AF1\_A+AF2\_A)/2 \quad (3)$$

$$AF\_B=(AF1\_B+AF2\_B)/2 \quad (4)$$

Similarly, AF extracted images obtained by a plurality of image sensing operations are combined. The values of AF extracted images during combination are stored in the focus detection pixel combining circuit 121.

In the above-described way, the focus detection pixel combining circuit 121 can increase the number of focus detection pixels, thereby increasing the resolution and reducing aliases. In this case, increasing the resolution means increasing the number of SAF pixels when calculating the defocus amount.

Information of a focus detection pixel (A image) 205 and focus detection pixel (B image) 206 obtained by averaging images sensed by a plurality of image sensing operations is output to the switching circuit 123, and then to the phase difference AF circuit 108.

The phase difference AF circuit 108 obtains the defocus amount by comparing the phase differences between A and B images using the focus detection pixels (A images) 202 and focus detection pixels (B images) 203 before combination, and the focus detection pixel (A image) AF_A and focus detection pixel (B image) AF_B. The phase difference AF circuit 108 outputs the obtained defocus amount as focusing information to the system controller 113.

<Second Focus Detection Pixel Combining Method>

Figure 4:
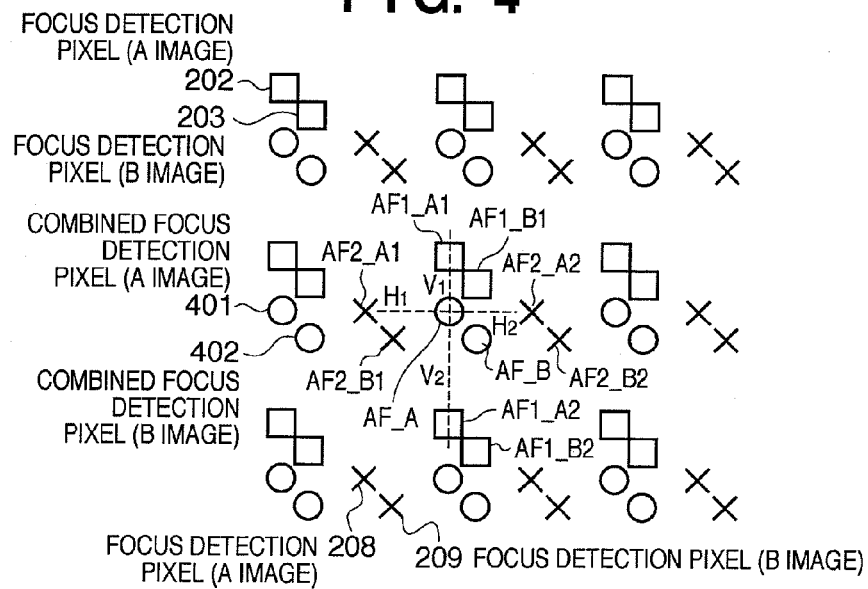
FIG. 4 is a view showing a state in which shifted focus detection pixels in the second image sensing operation are interpolated to the same horizontal positions as those of focus detection pixels in the first image sensing operation.

FIG. 4 shows the second focus detection pixel combining method.

Assume that AF information of positions indicated by focus detection pixels (A images) 202 and focus detection pixels (B images) 203 is obtained in the first image sensing operation, and AF information of positions indicated by focus detection pixels (A images) 208 and focus detection pixels (B images) 209 is obtained in the second image sensing operation.

Interpolation is done by weighting at positions where no AF information is obtained by the first and second image sensing operations, thereby increasing the sampling points of focus detection pixels.

At the positions of combined focus detection pixels (A images) 401 and combined focus detection pixels (B images) 402 in FIG. 4, A images are interpolated by A images, and B images are interpolated by B images.

The focus detection pixel value AF_A of the combined focus detection pixel (A image) 401 is calculated using the focus detection pixel values AF1_A1, AF1_A2, AF2_A1, and AF2_A2 of neighboring focus detection pixels (A images):

$$AF\_A=\{(AF1\_A1*V2+AF1\_A2*V1)+(AF2\_A1*H2+AF2\_A2*H1)\}/2 \quad (5)$$

The focus detection pixel value AF_B of the combined focus detection pixel (B image) 402 is calculated using the focus detection pixel values AF1_B1, AF1_B2, AF2_B1, and AF2_B2 of neighboring focus detection pixels (B images):

$$AF\_B=\{(AF1\_B1*V2+AF1\_B2*V1)+(AF2\_B1*H2+AF2\_B2*H1)\}/2 \quad (6)$$

H1 and H2 represent the ratio of the horizontal distance between AF2_A1 and AF2_A2, and that of the horizontal distance between AF2_B1 and AF2_B2. H1 and H2 satisfy H1+H2=1.

V1 and V2 represent the ratio of the vertical distance between AF1_A1 and AF1_A2, and that of the vertical distance between AF1_B1 and AF1_B2. V1 and V2 satisfy V1+V2=1.

In this manner, interpolation is executed at positions where no focus detection pixel value is obtained.

The methods of increasing the resolution by increasing the number of focus detection pixels from images obtained by two image sensing operations have been described. When combining AF extracted images obtained by two or more image sensing operations, the focus detection pixel combining circuit 121 stores a focus detection pixel value obtained by each image sensing operation in order to perform interpolation at positions where no focus detection pixel value is obtained after two or more image sensing operations.

The method of increasing the resolution by increasing the number of focus detection pixels from images obtained by two image sensing operations is also applicable to a case wherein three or four image sensing operations are executed. More specifically, the number of focus detection pixels is increased from images obtained by the first and second image sensing operations, those obtained by the second and third image sensing operations, and those obtained by the third and fourth image sensing operations.

As described above, the focus detection pixel combining circuit 121 increases the number of focus detection pixels, thereby increasing the resolution and reducing aliases. In this case, increasing the resolution means increasing the number of SAF pixels when calculating the defocus amount.

Information of a focus detection pixel (A image) 208 and focus detection pixel (B image) 209 obtained by averaging images sensed by a plurality of image sensing operations is output to the switching circuit 123, and then to the phase difference AF circuit 108. The phase difference AF circuit 108 obtains the defocus amount by comparing the phase differences between A and B images using the focus detection pixels (A images) 202 and focus detection pixels (B images) 203 before combination, and the focus detection pixel (A image) AF_A and focus detection pixel (B image) AF_B. The phase difference AF circuit 108 outputs the obtained defocus amount as focusing information to the system controller 113.

In accordance with the defocus amount obtained in the phase difference AF circuit 108, the system controller 113 notifies the lens driving circuit 102 of the driving amount of a focus adjustment lens in the imaging lens 101, thereby adjusting the focus.

<Image Recording Processing>

The system controller 113 repetitively executes the above-described focus adjustment. The signal processing circuit 109 performs signal processing such as color conversion processing for obtained image data. The memory control circuit 110 temporarily writes the image data in the DRAM 111.

The memory control circuit 110 reads out the image data from the DRAM 111. The resizing circuit 112 resizes the image data to a size suitable for display on the monitor 115 or a size suitable for recording on the medium card 118. The memory control circuit 110 writes the resized image data again in the DRAM 111.

The memory control circuit 110 reads out the image data from the DRAM 111. According to the NTSC or PAL scheme, the video modulation circuit 114 modulates the image data resized to a size suitable for display on the monitor 115. The monitor 115 displays the image data.

The image data resized to a size suitable for recording on the medium card 118 is written in the medium card 118 by a card control circuit.

<Case Wherein Object is Moving>

A matching calculation method when the object is moving will be explained.

Figure 5:
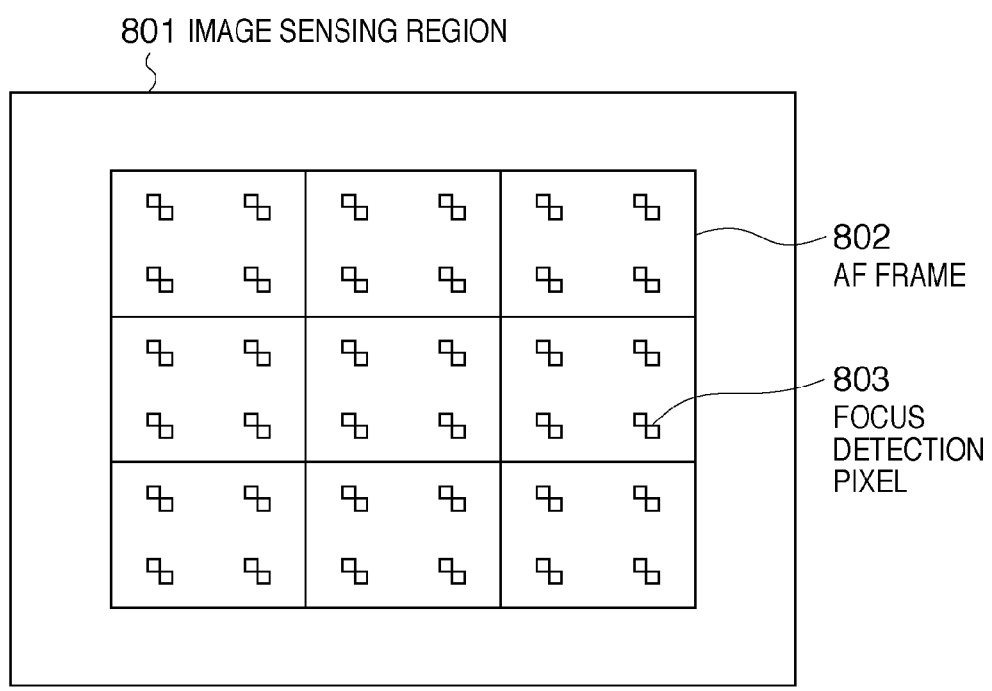
FIG. 5 is a view for explaining an AF frame.

As shown in FIG. 5, an AF frame 802 is divided into nine, and object motion vectors in the nine AF frames 802 are different from each other. The motion is detected in each AF frame 802 to detect an object distance. An AF frame 802 to be focused may be determined automatically on the basis of the object distance detection result of each AF frame 802 or by a user operation. When AF evaluation is performed by tracking an object to be focused after determining an AF frame 802 to be focused, the position of the entire image may also be adjusted in accordance with a motion vector detected in the AF frame 802.

<Shift Amount>

The above shift of images may occur by pixel shift. The pixel shift includes a processing for increasing the number of image sensing pixels or a processing for reducing a camera shake.

The shift amount detection circuit 119 may also obtain a shift amount when the image sensing region 201, 204, or 207 is shifted to increase the number of image sensing pixels. The shift amount detection circuit 119 may also obtain a shift amount when the image sensing region 201, 204, or 207 is shifted to reduce camera shake.

Second Embodiment

Figure 6:
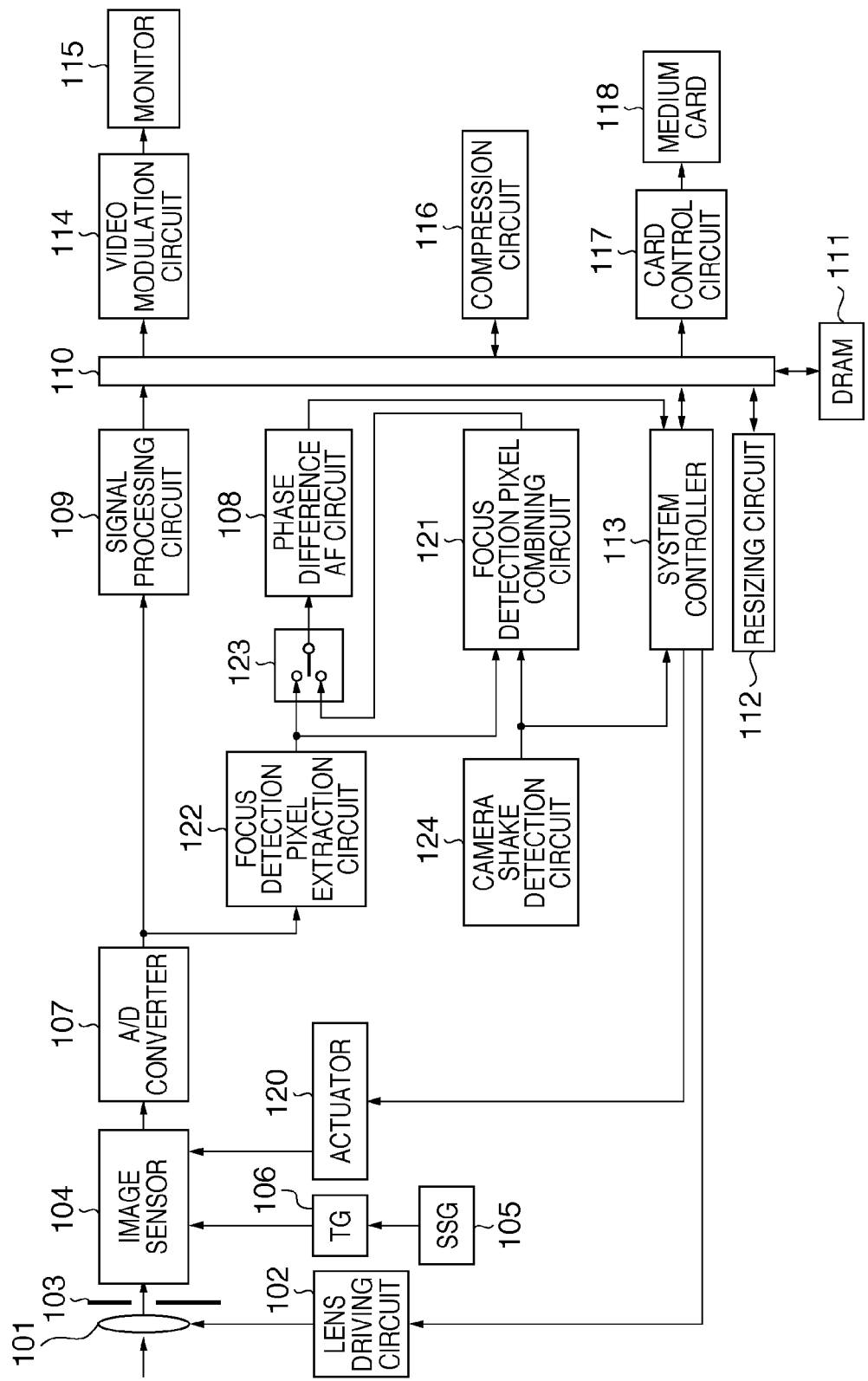
FIG. 6 is a block diagram showing the circuit arrangement of an image sensing apparatus according to the second embodiment of the present invention.

FIG. 6 is a block diagram showing the circuit arrangement of an image sensing apparatus according to the second embodiment of the present invention.

The same reference numerals as those in FIG. 1 which is a block diagram of the circuit arrangement of the first embodiment denote the same circuits.

The second embodiment is different from the first embodiment in that a camera shake detection circuit 124 replaces the shift amount detection circuit 119. The camera shake detection circuit 124 detects vibrations using a gyroscope or the like, and measures a shift amount generated by camera shake.

The camera shake detection circuit 124 outputs the shift amount to a focus detection pixel combining circuit 121 and system controller 113.

The focus detection pixel combining circuit 121 reads out image data from the DRAM 111. The shift amount detected by the camera shake detection circuit 124 is set as a weighting coefficient. Then, focus detection pixels are averaged or interpolated, as described in the first embodiment. The averaged or interpolated focus detection pixel information is output to a phase difference AF circuit 108 via a switching circuit 123. The phase difference AF circuit 108 executes AF processing.

The actuator 120 in FIGS. 1 and 6 is necessary to move the image sensor to an arbitrary position and obtain shifted images by a plurality of image sensing operations when no camera shake occurs. However, when camera shake occurs, the shift amount detection circuit 119 or camera shake detection circuit 124 can detect the shift amount between images to obtain a weighting coefficient used to average or interpolate AF extracted images. Thus, the actuator 120 may not be installed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119057, filed Apr. 30, 2008, which is hereby incorporated by reference herein in its entirety.

The invention claimed is:

1. An image sensing apparatus comprising:
    image sensing means including an image sensor having a plurality of image sensing pixels for photoelectrically converting an object image formed via an imaging lens to generate an image signal, and a plurality of focus detection pixels discretely arranged between the plurality of image sensing pixels;
    shift detection means for detecting a shift amount between images obtained by a plurality of image sensing operations using signals of the image sensing pixels contained in image signals obtained by the plurality of image sensing operations that are continuously obtained by said image sensing means and shifted in position from each other;
    combining means for combining signals of the focus detection pixels contained in the images obtained by the plurality of image sensing operations on the basis of the shift amount detected by said shift detection means; and
    focus adjustment means for adjusting a focus of the imaging lens by using signals of the focus detection pixels before being combined by said combining means, and signals of the focus detection pixels that are combined by said combining means.

2. The apparatus according to claim 1, further comprising shift means for shifting a position of the image sensor to obtain the image signals by the plurality of image sensing operations that are shifted in position from each other.

3. The apparatus according to claim 1, wherein said combining means combines the signals of the focus detection pixels contained in the images obtained by the plurality of image sensing operations by averaging, based on the shift amount, signals of the focus detection pixels contained in the images obtained by the plurality of image sensing operations, and signals of neighboring focus detection pixels.

4. A method of controlling an image sensing apparatus having an image sensing means including an image sensor having a plurality of image sensing pixels for photoelectrically converting an object image formed via an imaging lens to generate an image signal, and a plurality of focus detection pixels discretely arranged between the plurality of image sensing pixels, the method comprising:

a shift detection step of detecting a shift amount between images obtained by a plurality of image sensing operations using signals of the image sensing pixels contained in image signals obtained by the plurality of image sensing operations that are continuously obtained by the image sensing means and shifted in position from each other;

a combining step of combining signals of the focus detection pixels contained in the images obtained by the plurality of image sensing operations on the basis of the shift amount detected in the shift detection step; and a focus adjustment step of adjusting a focus of the imaging lens by using signals of the focus detection pixels before being combined in the combining step, and signals of the focus detection pixels that are combined in the combining step.

* * * * *